United States Patent [19]
Ma et al.

[11] Patent Number: 5,559,197
[45] Date of Patent: Sep. 24, 1996

[54] MODIFIED PHENOLIC RESIN TOUGHENED BY PHENOXY RESIN

[75] Inventors: Chen-Chi M. Ma; Hew-Der Wu, both of Hsinchu, Taiwan

[73] Assignee: National Science Council, Taipei, Taiwan

[21] Appl. No.: 515,133

[22] Filed: Aug. 15, 1995

[51] Int. Cl.$^6$ .................................................. C08G 59/14
[52] U.S. Cl. ........................................... 525/533; 528/154
[58] Field of Search .............................. 525/533; 528/154

[56] References Cited

U.S. PATENT DOCUMENTS

| | | | |
|---|---|---|---|
| 4,157,324 | 6/1979 | Culbertson | 528/130 |
| 4,182,732 | 1/1980 | Fry | 525/428 |
| 5,087,657 | 2/1992 | Qureshi et al. | 524/508 |

OTHER PUBLICATIONS

Encyclopedia of Polymer Science & Engineering, vol. 6, p. 331.

*Primary Examiner*—Melvyn I. Marquis
*Assistant Examiner*—D. Aylward
*Attorney, Agent, or Firm*—Hitt Chwang & Gaines, P.C.

[57] ABSTRACT

A modified phenolic resin which is toughened by phenoxy resin is disclosed. The modified phenolic resin is prepared by the following steps: mixing a phenoxy resin having a weight average molecular weight of 10,000–1,000,000 and phenol in a weight ratio of phenoxy resin:phenol=1.5:1–1:1 at an elevated temperature to form a glutinous mixture; mixing the glutinous mixture and an acid catalyst to obtain a viscous mixture having a relatively low viscosity compared to the glutinous mixture; mixing the viscose mixture and a resole type phenolic resin to form a modified phenolic resin, wherein the resole type phenolic resin has a solid content of 60—75 wt. % and a free aldehyde content of 5–10 wt. %, the amount of the acid catalyst mixed is 2–10 wt. %, and the amount of the phenoxy resin mixed is 3–25 wt. % based on the resole type phenolic resin.

7 Claims, No Drawings

MODIFIED PHENOLIC RESIN TOUGHENED BY PHENOXY RESIN

FIELD OF THE INVENTION

The present invention is related to a modified phenolic resin, in particular to a modified phenolic resin which is toughened by phenoxy resin.

BACKGROUND OF THE INVENTION

Conventional resins used in a pultrusion process for making a fiber reinforced resin composite are thermoset resins, such as unsaturated polyester resin and epoxy resins. Phenolic resin which is known to have excellent mechanical properties and electrical properties, especially at elevated temperatures, has been used to produce fiber reinforced products by prepreging, compounding, reaction injection molding or pultrusion processes, but phenolic resin used as a binder in the fabrication of a fiber reinforced composite product so far is still not so popular compared to the others due to its brittle nature which causes its poor coupling with fiber, its slow curing rate, and due to the side product (water) which may be generated causing void defects. Therefore there is a need in the composite industry to improve the quality and properties of a pultruded fiber reinforced phenolic based resin composite.

Several methods have been developed to toughen phenolic resin. For examples, U.S. Pat. No. 2,267,390 uses China wood oil (tung oil), Japanese Patent No. 29–7595 uses rosin, U.S. Pat. No. 2,675,335 uses alkyl phenol, U.S. Pat. No. 4,125,502 uses vinyl acetate and U.S. Pat. No. 4,157,324 uses high ortho etherified resole type phenolic resin for toughening phenolic resin. However, these methods all require the modifying agents to react with phenolic resin for a period of time in order to obtain the desired toughening effect.

At present meta-hydroxyl phenol catalyst is used to shorten the gel time of phenolic resin so that it can be used in manufacturing a fiber reinforced composite product; however, the addition of meta-hydroxyl phenol catalyst also decreases the storage stability of phenolic resin and pot life of phenolic resin.

It is known that the coupling between phenolic resin and the surface of a common fiber is poor, and filaments having a special surface treatment are necessary for the fabrication of a fiber reinforced phenolic resin, e.g. filaments having a special surface treatment by isocyanate based coupling agent are available from the fiber glass manufacturers, e.g. Clark-Schwebel Fiberglass Corp., US, etc. These special treated filaments result in more stocks and production costs, and an additional operation procedure of changing different filaments.

Phenoxy resin is a bisphenol-A type resin having the following formula:

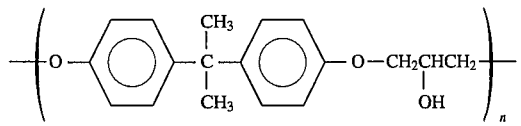

wherein n is integer of 38 to an integer larger than 60. Phenoxy resin unlike a common liquid type epoxy resin which has a n value lower than 15 is a solid type resin. Phenoxy resin is useful in manufacturing molded articles by an injection molding process similar to the thermoplastic resin, and can also be used as a thermoset resin by mixing a curing agent therewith.

To our knowledge there is no one in the prior art who taught or suggested using phenoxy resin to toughen phenolic resin, increase the curing rate of phenolic resin without adversely affecting the storage stability thereof, and enhance the coupling between phenolic resin and fiber at the same time. There is no method developed so far by which one can successfully blend the phenoxy resin in the phenolic resin.

The present inventors are the first ones who successfully develop a new technique to blend phenoxy resin in phenolic resin, whereby a modified phenolic resin having improved toughness, storage stability and interfacial coupling with other substrates is obtained.

SUMMARY OF THE INVENTION

The primary objective of the present invention is to provide a modified phenolic resin toughened by phenoxy resin.

In order to achieve the objective a modified phenolic resin accomplished in accordance with the present invention is prepared by the following steps:

a) mixing a phenoxy resin having a weight average molecular weight of 10,000–1,000,000 and phenol in a weight ratio of phenoxy resin:phenol=1.5:1–1:1 at an elevated temperature to form a glutinous mixture;

b) mixing the glutinous mixture of step a) and an acid catalyst to obtain a viscous mixture having a relatively low viscosity compared to the glutinous mixture;

c) mixing the viscose mixture of step b) and a resole type phenolic resin to form a modified phenolic resin, wherein the resole type phenolic resin has a solid content of 60–75 wt. % and a free aldehyde content of 5–10 wt. %, the amount of the acid catalyst mixed is 2–10 wt. %, and the amount of the phenoxy resin mixed is 3–25 wt. % based on the resole type phenolic resin.

The present inventors are surprised to find that the viscosity of the glutinous mixture in step a) can be significantly reduced by the addition of the acid catalyst. It is believed that the acid catalyst causes the phenoxy resin in the glutinous mixture become charge-carrying, and thus enhances its solubility in the polar phenol solvent, whereby facilitates the blending of the phenoxy resin with the resole type phenolic resin.

Contemplated as the functional, or operative, equivalent to the acid catalyst for purpose of the present invention is an electrolyte having catalytic ability.

DETAILED DESCRIPTION OF THE INVENTION

The present invention is directed to a modified phenolic resin toughened by phenoxy resin, which is prepared by the following steps:

a) mixing a phenoxy resin having a weight average molecular weight of 10,000–1,000,000 and phenol in a weight ratio of phenoxy resin:phenol=1.5:1–1:1, preferably 1:1, and heating the resulting mixture to form a glutinous mixture;

b) mixing the glutinous mixture of step a) and an acid catalyst to obtain a viscous mixture having a relatively low viscosity compared to the glutinous mixture;

c) mixing the viscose mixture of step b) and a resole type phenolic resin to form a modified phenolic resin, wherein the resole type phenolic resin has a solid content of 60–75 wt. % and a free aldehyde content of 5–10 wt. %, the amount of the acid catalyst mixed is 2–10 wt. %, and the amount of the phenoxy mixed is 3–25 wt. %, preferably 10–15 wt. %, based on the resole type phenolic resin.

A suitable phenoxy resin for use in the present invention has the above formula (I) and is available from the market, which can be prepared by reacting bisphenol-A with epichloro hydrin such as epi-[1,2]-chloro-[3]-propane. The preparation of this phenoxy resin is well known in the art. Phenoxy resin has an excellent mechanical strength at room temperature. In addition, phenoxy resin has an ether linkage and hydroxyl radical, both of which can form a hydrogen bond with the phenol group of the resole type phenolic resin if the phenoxy resin is substantially mixed with the resole type phenolic resin. Therefore, the present invention not only provides a modified phenolic resin toughened by phenoxy resin but a compatible polymer blend consisting of a resole type phenolic resin and phenoxy resin. The ether linkage and hydroxyl radical of the phenoxy resin can also enhance the coupling between the modified phenolic resin and a substrate when it is used as a coating composition, adhesive or binder of a fiber reinforced resin composite.

A suitable process for preparing the resole type phenolic resin is by carrying out a condensation reaction of an excess amount of formaldehyde or the like and phenol in the presence of an alkaline catalyst. This process is well known in the art, such as the process described in U.S. Pat. No. 4,419,400, the disclosure of which is incorporated herein by reference.

The acid catalyst, also known as curing agent, is well known in the art, including the organic acid catalyst disclosed in UK patent 1,363,277, details thereof are incorporated by reference. A preferred catalyst is selected from the group consisting of p-toluenesulfonic acid, phenolsulfonic acid, benzoic acid and phosphoric acid. The amount of said acid catalyst used ranges from 2 to 10 wt. % based on the weight of the resole type phenolic resin, and preferably is about 5 wt. %.

A suitable phenol for use in the present invention includes (but not limited to) phenol, ortho-cresol, meta-cresol, para-cresol, dimethyl phenol, ethyl phenol, para-phenyl phenol, para-butyl phenol, para-pentyl phenol, bisphenol-A and meta-dihydroxyl benzene.

In one of the preferred embodiments of the present invention, phenoxy resin and phenol were mixed and stirred at 150° C. to form a glutinous material, to which p-toluenesulfonic acid was then added while stirring, and a viscose mixture having a viscosity of 200 cps at 150° C. was obtained. The viscose mixture was cooled to 90° C. while a resole type phenolic resin was being heated to the same temperature, and then they were mixed with each other and well stirred to obtain a modified phenolic resin of the present invention. This modified phenolic resin has a viscosity of 500–2800 cps after being cooled to 30° C., which increases to 2100–4250 cps after a period of 28 hours. The viscosity was measured according to the method of ASTM D2393 with a Brookfield Viscometer.

As it is well known in the art, mineral fillers such as talc, silica, and clay, etc. may be added into the liquid resin in order to improve the mechanical properties of the pultruded composites. The amount of said mineral fillers added is 10–20 wt. % based on the weight of the modified phenolic resin.

The present modified phenolic resin can be used at least in the fabrication of a coating composition, adhesive composition and fiber reinforced resin composite. In each of the applications, the present modified phenolic resin used generates a significantly less amount of water side product during the cross-linking thereof such that the void content resulting from evaporation of water is decreased, and thus the toughness and mechanical strength of the final products are remarkably enhanced.

The invention will be further illustrated by a pultrusion process in the following examples in which parts and percentages are by weight unless otherwise indicated.

EXAMPLE

I) Preparation of Modified Phenolic Resin

The modified phenolic resin was prepared in accordance with the formula listed in the following Table 1.

TABLE 1

| Constituent | weight (gram) |
| --- | --- |
| 1) phenoxy resin | 15 |
| 2) phenol | 15 |
| 3) p-toluenesulfonic acid | 5 |
| 4) resole type phenolic resin | 100 |

1) The phenoxy resin is manufactured by Union Carbide Company, US, and has a weight average molecular weight of 23,000.
2) The phenol is a reagent grade compound and available from Japan Pure Chemicals Industrial Co. (Japan).
3) The p-toluenesulfonic acid is a reagent grade compound and available from Japan Pure Chemicals Industrial Co. (Japan).
4) The resole type phenolic resin is a commercial phenol-formaldehyde resole type resin having a solid content of 70–75 wt % and sold under a code of PF-750 from Chang Chun Plastics Co., Ltd., Taiwan.

15 g phenoxy resin and 15 g phenol were mixed and stirred under nitrogen purge at 150° C. for one hour, and a miscible glutinous material was obtained. 5 g p-toluenesulfonic acid was then added to the glutinous material, the resulting mixture was thoroughly stirred for about 3 minutes, and a solution having a viscosity of about 200 cps at 150° C. was obtained. This solution was kept in an oven at 90° C. and ready for mixing with the resole type phenolic resin.

100 g of resole type phenolic resin was heated in an oven at 90° C. for 15 minutes, then added to the 90° C. solution while gently stirring, and a miscible viscose solution was formed.

The aforesaid procedures were repeated except that the weight of the phenoxy resin was changed to prepare modified phenolic resin products having different percentages (phr) of phenoxy resin based on the weight of the resole type phenolic resin.

II) Pultrusion

The modified phenolic resin product prepared above was placed in an impregnating tank and maintained at a room temperature of 30° C. 20 rovings of 764-NT-218 glass fiber (PPG Co., US) were drawn into a bath of the impregnating resin which was maintained at 30%. 764-NT-218 glass fiber has a specific gravity of 2.54, and a single strand of this fiber has a diameter of 13.1 μm and a tensile strength of $2.2 \times 10^5$ psi. The impregnated glass fiber rovings were passed through a squeeze orifice to remove excess resin and air and through a 82-cm long, 1.27-cm wide and 0.319-cm thick curing die. Two sets of individually controlled electrical plate heaters were installed on both top and bottom of the die, where the first and the second set of plate heaters have a length of 30 cm, and a temperature of 180° C. and 200° C. respectively. The pulling rate was fixed at 30 cm/min. The final pultruded composite product has a fiber content of 50 vol % and a specific gravity of 1.60.

III) Test Specimens of the Pultruded Composites

The glass fiber reinforced modified phenolic resin composites pultruded according to the above-described process with modified phenolic resins containing different contents of resole type phenolic resin were tested in accordance with the method of ASTM D3039, ASTM D790 and ASTM D256 to obtain their tensile strength, flexural strength and notched Izod impact strength, respectively. The results are shown in Table 2.

TABLE 2

| Phenoxy resin content, phr | 0 | 3 | 6 | 9 | 12 | 15 | 18 |
|---|---|---|---|---|---|---|---|
| Tensile strength, MPa | 323 | 451 | 453 | 572 | 694 | 669 | 618 |
| Flexural strength, GPa | 571 | 518 | 531 | 546 | 548 | 541 | 59 |
| Notched Izod impact strength, ft-lb/in | 19.5 | 24 | 36 | 38 | 60 | 54 | 48 |

The final pultruded composites were further subjected to a postcuring treatment at a temperature of 180° C. for a period of one hour. The tensile strength, flexural strength and notched Izod impact strength of the postcured composites are also shown in Table 3.

TABLE 3

| Phenoxy resin content, phr | 0 | 3 | 6 | 9 | 12 | 15 | 18 |
|---|---|---|---|---|---|---|---|
| Tensile strength, MPa | 363 | 547 | 567 | 667 | 770 | 812 | 694 |
| Flexural strength, GPa | 693 | 679 | 697 | 703 | 706 | 732 | 660 |
| Notched Izod impact strength, ft-lb/in | 33 | 39 | 49 | 55.5 | 75 | 71.3 | 69 |

As it can be seen from the data in Tables 2 and 3 that the tensile strength of the glass fiber/modified phenolic resin composite is enhanced when the percentage (phr) of phenoxy resin based on the weight of the resole type phenolic resin increases from 0 to 12 or 15% phr. Similar observation is also found in the flexural strength of the composites. The results show that the blending of phenoxy resin in the resole type phenolic resin has a good toughening effect.

The following Table 4 lists the variation of viscosity of the modified phenolic resin products prepared above. The viscosity was measured according to the method of ASTM D2393 with a Brookfield Viscometer.

TABLE 4

| Storage time, hr | Viscosity (cps) | | | |
|---|---|---|---|---|
| Phenoxy resin content, phr | 0 | 8 | 16 | 24 |
| 0 | 310 | 500 | 650 | 910 |
| 6 | 500 | 1000 | 1600 | 2100 |
| 12 | 1400 | 1900 | 2000 | 3500 |

TABLE 4-continued

| Storage time, hr | Viscosity (cps) | | | |
|---|---|---|---|---|
| Phenoxy resin content, phr | 0 | 8 | 16 | 24 |
| 18 | 2800 | 3200 | 3950 | 4250 |
| Pure resole type phenolic resin* | 1400 | 7800 | — | — |

*The resole type phenolic resin is a commercial phenol-formaldehyde resole type resin having a solid content of 70–75 wt % and sold under a code of PF-750 from Chang Chun Plastics Co., Ltd., Taiwan.

The data in Table 4 show that the viscosity of the modified phenolic resin increases with the increase of the phenoxy content thereof; however, the increasing rate of viscosity is rather low so that the modified phenolic resin has a long pot life which is even longer than that of the pure resole type phenolic resin, and thus has a good storage stability.

What is claimed is:

1. A modified phenolic resin toughened by phenoxy resin, which is prepared by the following steps:

a) mixing a phenoxy resin having a weight average molecular weight of 10,000–1,000,000 and phenol in a weight ratio of phenoxy resin:phenol=1.5:1–1:1 at an elevated temperature to form a glutinous mixture;

b) mixing the glutinous mixture of step a) and an acid catalyst to obtain a viscous mixture having a relatively low viscosity compared to the glutinous mixture;

c) mixing the viscose mixture of step b) and a resole type phenolic resin to form a modified phenolic resin, wherein the resole type phenolic resin has a solid content of 60–75 wt. % and a free aldehyde content of 5–10 wt. %, the amount of the acid catalyst mixed is 2–10 wt. %, and the amount of the phenoxy resin mixed is 3–25 wt. % based on the resole type phenolic resin.

2. The modified phenolic resin according to claim 1, wherein the phenoxy resin has a weight average molecular weight of 10,000–100,000.

3. The modified phenolic resin according to claim 1, wherein the phenoxy resin and the phenol are mixed in a weight ratio of phenoxy resin:phenol=1:1.

4. The modified phenolic resin according to claim 1, wherein the amount of the acid catalyst mixed is 5 wt. % based on the weight of the resole type phenolic resin.

5. The modified phenolic resin according to claim 1, wherein the amount of the phenoxy resin mixed is 10–15 wt. % based on the resole type phenolic resin.

6. The modified phenolic resin according to claim 1, wherein said acid catalyst is selected from the group consisting of p-toluenesulfonic acid, phenolsulfonic acid, benzoic acid and phosphoric acid.

7. The modified phenolic resin according to claim 1, wherein said phenol is selected from the group consisting of phenol, ortho-cresol, meta-cresol, para-cresol, dimethyl phenol, ethyl phenol, para-phenyl phenol, para-butyl phenol, para-pentyl phenol, bisphenol-A and meta-dihydroxyl benzene.

* * * * *

UNITED STATES PATENT AND TRADEMARK OFFICE
CERTIFICATE OF CORRECTION

PATENT NO. : 5,559,197
DATED : September 24, 1996
INVENTOR(S) : Ma et al.

It is certified that error appears in the above-indentified patent and that said Letters Patent is hereby corrected as shown below:

Col. 4, line 57, change "30%" to -- 30°C. --.

Col. 5, line 20, in the last column of Table 2, change "59" to -- 595 --.

Signed and Sealed this

Eighteenth Day of February, 1997

Attest:

BRUCE LEHMAN

*Attesting Officer*    *Commissioner of Patents and Trademarks*